United States Patent
Kammer et al.

(10) Patent No.: US 12,410,771 B1
(45) Date of Patent: Sep. 9, 2025

(54) SYSTEM AND METHOD FOR COMPENSATING FOR ROTOR IMBALANCE IN A WIND TURBINE

(71) Applicant: GE Infrastructure Technology LLC, Greenville, SC (US)

(72) Inventors: Leonardo Cesar Kammer, Niskayuna, NY (US); Justin Edwin Barton, North Huntingdon, PA (US); Atinuke Ademola-Idowu, Glenville, NY (US)

(73) Assignee: GE Vernova Infrastructure Technology LLC, Greenville, SC (US)

(*) Notice: Subject to any disclaimer, the term of this patent is extended or adjusted under 35 U.S.C. 154(b) by 0 days.

(21) Appl. No.: 18/735,569

(22) Filed: Jun. 6, 2024

(51) Int. Cl.
*F03D 7/02* (2006.01)
*F03D 7/04* (2006.01)

(52) U.S. Cl.
CPC .......... *F03D 7/0224* (2013.01); *F03D 7/045* (2013.01); *F05B 2270/32* (2013.01); *F05B 2270/328* (2013.01); *F05B 2270/334* (2013.01)

(58) Field of Classification Search
CPC ...... F03D 7/0224; F03D 7/045; F03D 17/016; F03D 17/015; F05B 2270/328; F05B 2270/334
See application file for complete search history.

(56) References Cited

U.S. PATENT DOCUMENTS

| | | | |
|---|---|---|---|
| 7,874,797 B2 | 1/2011 | Pierce et al. | |
| 7,944,067 B2* | 5/2011 | Kammer | F03D 7/0224 290/44 |
| 8,240,990 B2* | 8/2012 | Kammer | F03D 7/0264 416/61 |
| 10,982,651 B2* | 4/2021 | Caponetti | F03D 7/0296 |
| 11,572,865 B2 | 2/2023 | Vasudevan et al. | |
| 11,754,043 B2 | 9/2023 | Hammerum et al. | |

* cited by examiner

*Primary Examiner* — Michael L Sehn
(74) *Attorney, Agent, or Firm* — Dority & Manning, P.A.

(57) ABSTRACT

The present disclosure is directed to a method of compensating for rotor imbalance of a wind turbine. The method includes receiving, via a processor of a controller of the wind turbine, a signal associated with an acceleration of a tower and a signal associated with a position of a rotor. The method also includes estimating a rotor imbalance based on the signal associated with the acceleration of the tower. The method also includes estimating, via an adaptive filter algorithm, components of the rotor imbalance relative to the rotor position. The method also includes calculating a respective pitch angle offset for the rotor blades of the wind turbine based on the estimated components of the rotor imbalance. The method also includes adjusting a pitch angle of each of the rotor blades by the respective pitch angle offset, thereby reducing first excitation magnitude disturbances on the acceleration of the tower.

20 Claims, 9 Drawing Sheets

SYSTEM AND METHOD FOR COMPENSATING FOR ROTOR IMBALANCE IN A WIND TURBINE

FIELD

The present disclosure relates generally to wind turbines and more particularly, to systems and methods for compensating for rotor imbalance in a wind turbine to reduce or minimize undesirable tower motion caused by such imbalance.

BACKGROUND

Wind power is considered one of the cleanest, most environmentally friendly energy sources presently available, and wind turbines have gained increased attention in this regard. A modem wind turbine typically includes a tower, a generator, a gearbox, a nacelle, and one or more rotor blades. The rotor blades are the primary elements for converting wind energy into electrical energy. The blades typically have the cross-sectional profile of an airfoil such that, during operation, air flows over the blade producing a pressure difference between its sides. Consequently, a lift force, which is directed from the pressure side towards the suction side, acts on the blade. The lift force generates torque on the main rotor shaft, which is connected to a generator for producing electricity.

The amount of power that may be produced by a wind turbine is typically limited by structural limitations (i.e., design loads) of the individual wind turbine components. For example, the blades of a wind turbine may experience loads associated with both average loading due to turbine operation and dynamically fluctuating loads due to environmental conditions. These loads may be affected by the pitch angle of the blades and other factors. Such loading may damage turbine components, thereby causing the turbine components to fail. The fluctuating loads can change day-to-day or season-to-season and may be influenced by wind speed, wind peaks, wind turbulence, wind shear, changes in wind direction, density in the air, bearing misalignment, upflow, or similar conditions.

Some factors that may cause fluctuation in the loads in the rotor blades are manufacturing tolerances, pitch-installation offsets, blade icing, blade airfoil roughness, etc. Such variability in rotor blade loading results in tower motion, especially in the lateral direction, which accelerates the life consumption of the tower and reduces the operating margin. Thus, in the case of tower configurations, it is helpful to ensure that the rotors are well-balanced to enable operation close to the wind turbine tower's natural frequency.

In view of the foregoing, the present disclosure is directed to system and methods for addressing rotor imbalances such that the variability in the forces exerted by the rotor blades is substantially reduced or eliminated.

BRIEF DESCRIPTION

Aspects and advantages of the present disclosure will be set forth in part in the following description, or may be obvious from the description, or may be learned through practice of the present disclosure.

In one aspect, the present disclosure is directed to a method of compensating for rotor imbalance of a wind turbine. The method includes receiving, via a processor of a controller of the wind turbine, at least one signal associated with an acceleration of a tower of the wind turbine and at least one signal associated with a position of a rotor of the wind turbine. The method also includes estimating a rotor imbalance based on the at least one signal associated with the acceleration of the tower. The method also includes estimating, via an adaptive filter algorithm programmed in the processor of the controller, components of the rotor imbalance relative to the rotor position. The method also includes calculating, via the controller, a respective pitch angle offset for a plurality of rotor blades of the wind turbine based on the estimated components of the rotor imbalance where the respective pitch angle offset for the plurality of rotor blades is configured to reduce a first excitation magnitude of rotor imbalance. The method also includes adjusting, via the controller, a pitch angle of each of the plurality of rotor blades by the respective pitch angle offset, thereby reducing first excitation magnitude disturbances on the acceleration of the tower.

In an embodiment of the method, the at least one signal associated with the acceleration of the tower of the wind turbine includes a side-to-side acceleration of the tower due to a natural frequency of the tower and the rotor imbalance, and the first excitation magnitude includes a partial side-to-side acceleration of the tower due to the rotor imbalance.

In an embodiment, the method further includes removing, from the at least one signal associated with the acceleration of the tower, the side-to-side acceleration of the tower due to a natural frequency of the tower by filtering the acceleration signal through an inverse model of the tower dynamics.

In an embodiment, the method further includes dividing the filtered tower acceleration of the wind turbine by a square of the rotor speed of the wind turbine.

In an embodiment of the method, the adaptive filter algorithm includes recursive least squares (RLS).

In an embodiment of the method, the estimated components of the rotor imbalance include sine and cosine components of the rotor position.

In an embodiment of the method, estimating, via the adaptive filter algorithm programmed in the processor of the controller, the components of the rotor imbalance relative to the rotor position includes estimating the components of the rotor imbalance at a plurality of wind speeds or air densities at the wind turbine or a plurality of rotor speeds or power levels of the wind turbine.

In an embodiment, the method further includes calculating the respective pitch angle offset for the plurality of rotor blades of the wind turbine based on the estimated components of the rotor imbalance via a proportional controller programmed in the processor of the controller.

In an embodiment of the method, calculating the respective pitch angle offset for the plurality of rotor blades based on the estimated components of the rotor imbalance further includes calculating a moment at the base of the tower using the rotor imbalance and at least one of wind speed or air density at the wind turbine or rotor speed or power level of the wind turbine; and determining the respective pitch angle offset for each of the plurality of rotor blades that corresponds to a minimum standard deviation of the moment at the base of the tower such that the sum of the respective pitch angle offset for each of the plurality of rotor blades is about equal to zero.

In an embodiment of the method, calculating the respective pitch angle offset for the plurality of rotor blades based on the estimated components of the rotor imbalance further includes calculating a moment at the base of the tower using the rotor imbalance and at least one of wind speed or air density at the wind turbine or rotor speed or power level of the wind turbine; and determining the respective pitch angle offset for each of the plurality of rotor blades that corresponds to a minimum standard deviation of the moment at the base of the tower such that the sum of the respective pitch angle offset for each of the plurality of rotor blades is about equal to zero.

In an embodiment of the method, calculating the respective pitch angle offset for the plurality of rotor blades based on the estimated components of the rotor imbalance further includes calculating the components of each pitch angle offset of the plurality of rotor blades; and determining the respective pitch angle offset for the plurality of rotor blades using the components of each pitch angle offset and at least one of wind speed or air density at the wind turbine or rotor speed or power level of the wind turbine.

In another aspect, the present disclosure is directed to a system for compensating for rotor imbalance of a wind turbine. The system includes the wind turbine including a tower, a rotor, and a plurality of rotor blades. The system also includes a controller communicatively coupled with the wind turbine, the controller including a processor. The controller is configured to receive, via the processor, at least one signal associated with an acceleration of a tower of the wind turbine and at least one signal associated with a position of a rotor of the wind turbine. The controller is also configured to estimate a rotor imbalance based on the at least one signal associated with the acceleration of the tower. The controller is also configured to estimate, via an adaptive filter algorithm programmed in the processor of the controller, components of the rotor imbalance relative to the rotor position. The controller is also configured to calculate a respective pitch angle offset for a plurality of rotor blades of the wind turbine based on the estimated components of the rotor imbalance where the respective pitch angle offset for the plurality of rotor blades is configured to reduce a first excitation magnitude of rotor imbalance. The controller is also configured to adjust a pitch angle of each of the plurality of rotor blades by the respective pitch angle offset, thereby reducing first excitation magnitude disturbances on the acceleration of the tower.

These and other features, aspects, and advantages of the present disclosure will become better understood with reference to the following description and appended claims. The accompanying drawings, which are incorporated in and constitute a part of this specification, illustrate embodiments of the present disclosure and, together with the description, serve to explain the principles of the present disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Reference now will be made in detail to embodiments of the present disclosure, one or more examples of which are illustrated in the drawings. Each example is provided by way of an explanation of the present disclosure, not a limitation of the present disclosure. In fact, it will be apparent to those skilled in the art that various modifications and variations can be made in the present disclosure without departing from the scope or spirit of the present disclosure. For instance, features illustrated or described as part of an embodiment can be used with another embodiment to yield a still further embodiment. Thus, it is intended that the present disclosure covers such modifications and variations as come within the scope of the appended claims and their equivalents.

Generally, the present disclosure is directed to systems and methods of compensating for a rotor imbalance of a wind turbine. Specifically, in an embodiment, the systems and methods of the present disclosure use a controller that receives one or more signal associated with the acceleration of a tower of the wind turbine. A signal associated with the position of the rotor of the wind turbine can also be received. In an embodiment, for example, the signal(s) may be received at various points in time and may provide data associated with how the tower of the wind turbine is moving for a given period of time. Further, the signal associated with the movement of the wind turbine may be used to estimate a rotor imbalance. An adaptive filter algorithm can then estimate components of the rotor imbalance at the rotor position. In an embodiment, for example, the components may be sine and cosine components of the rotor imbalance. Moreover, the estimate of components of the rotor imbalance can be used to calculate a respective pitch angle offset for each rotor blade of the wind turbine to reduce a first excitation magnitude of the rotor imbalance. The controller can then instruct the wind turbine to adjust a pitch angle of each of the rotor blades by the respective pitch angle offset to reduce the first excitation magnitude, thereby resulting in a reduction of first excitation magnitude disturbances on the acceleration of the tower. As a result, the acceleration of the tower may be reduced.

Thus, the systems and methods of the present disclosure may result in a reduction of the impact that the rotor imbalance has on the operation and energy output of the wind turbine. Accordingly, the operating life of the wind turbine may be lengthened, and the stability of the power output, i.e., the power quality provided by the wind turbine may be improved. These and other features provided by the systems and methods of the present disclosure will be discussed in greater detail hereinbelow.

Figure 1:
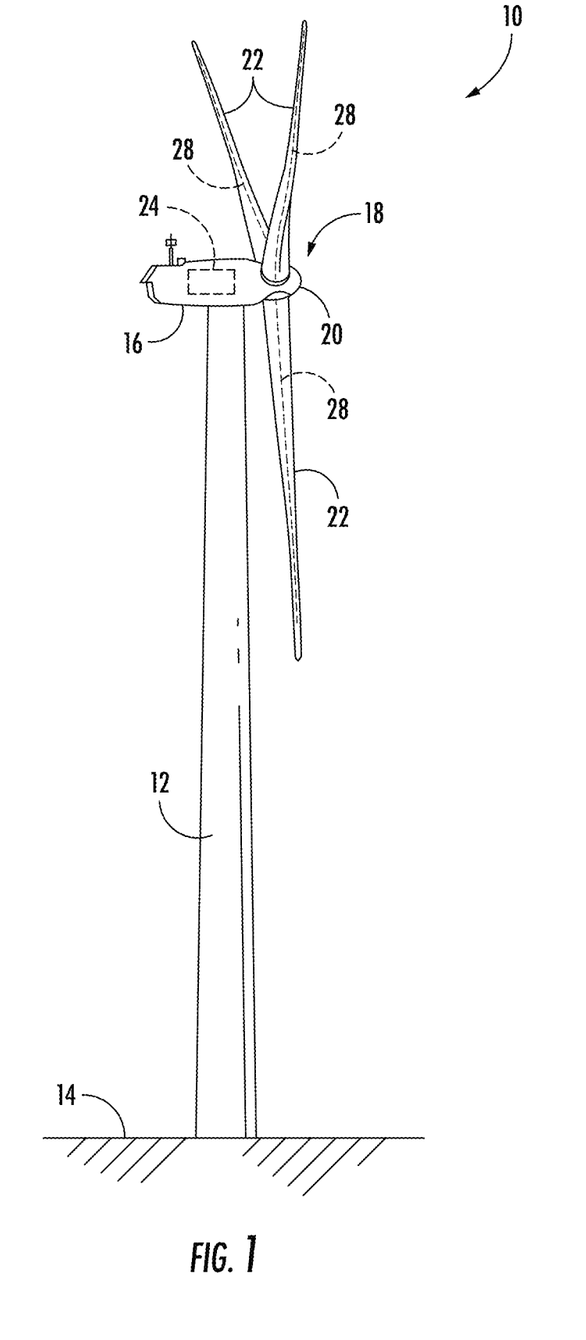
FIG. 1 illustrates a perspective view of an embodiment of a wind turbine according to the present disclosure.

Referring now to the figures, FIG. 1 illustrates a perspective view of an embodiment of a wind turbine according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine. Further, the controller 26 may be communicatively coupled to any number of the components of the wind turbine 10 in order to control the operation of such components and/or to implement a correction action. As such, the controller 26 may include a computer or other suitable processing unit. Thus, in several embodiments, the controller 26 may include suitable computer-readable instructions that, when implemented, configure the controller 26 to perform various functions, such as receiving, transmitting, and/or executing wind turbine control signals. Accordingly, the controller 26 may generally be configured to control the various operating modes (e.g., start-up or shut-down sequences), de-rate the wind turbine, and/or control various components of the wind turbine 10 as will be discussed in more detail below.

Figure 2:
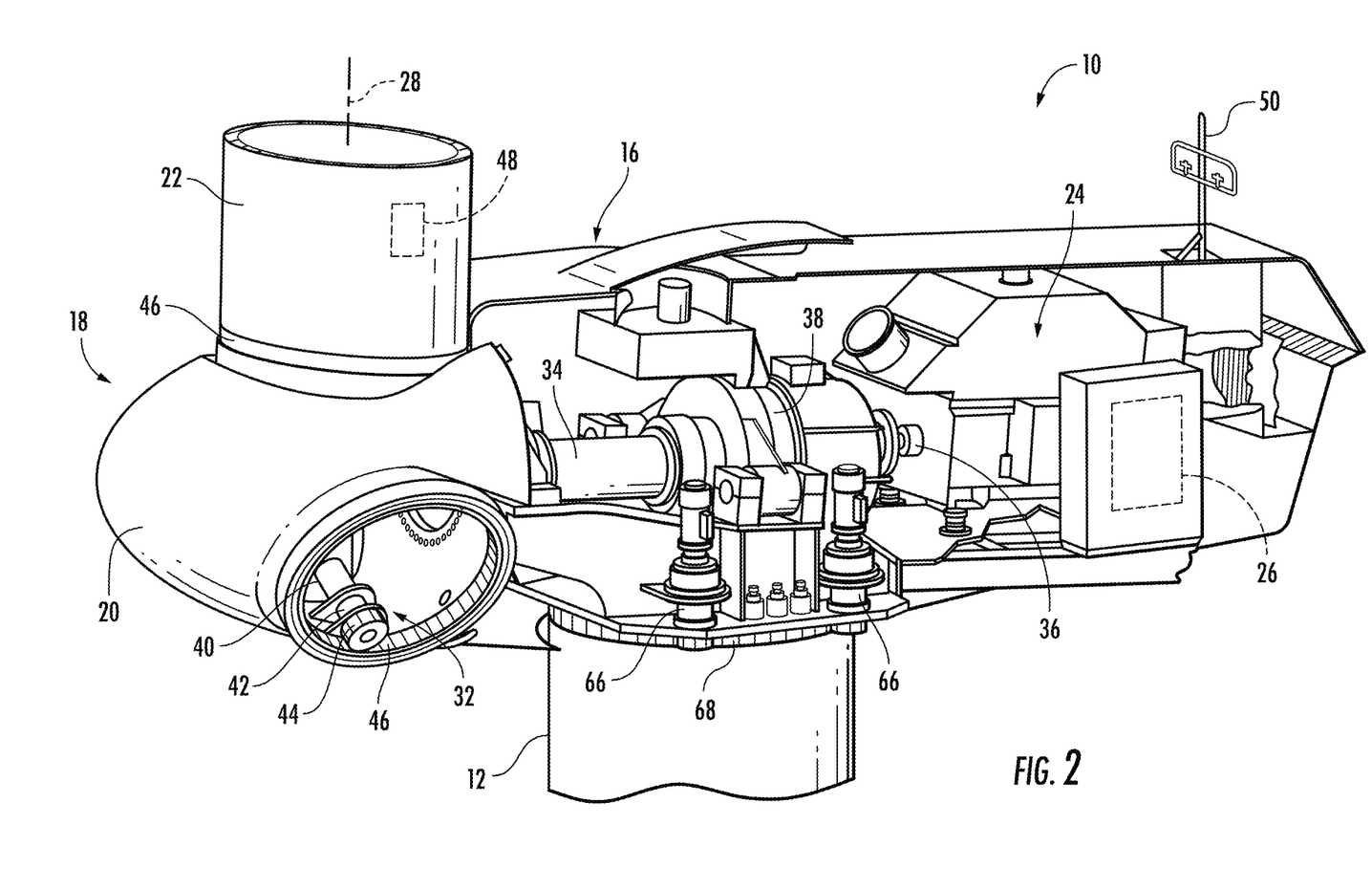
FIG. 2 illustrates a simplified, internal view of an embodiment of a nacelle of a wind turbine according to the present disclosure.

Referring now to FIG. 2, a simplified, internal view of an embodiment of the nacelle 16 of the wind turbine 10 shown in FIG. 1 is illustrated. As shown, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low-speed, high-torque input to a high-speed, low-torque output to drive the generator shaft 36 and, thus, the generator 24.

Each rotor blade 22 may also include a pitch adjustment mechanism 32 configured to rotate each rotor blade 22 about its pitch axis 28. Further, each pitch adjustment mechanism 32 may include a pitch drive motor 40 (e.g., any suitable electric, hydraulic, or pneumatic motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 coupled between the hub 20 and a corresponding rotor blade 22 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 22 about the pitch axis 28. Similarly, the wind turbine 10 may include one or more yaw drive mechanisms 66 communicatively coupled to the controller 26, with each yaw drive mechanism(s) 66 being configured to change the angle of the nacelle 16 relative to the wind (e.g., by engaging a yaw bearing 68 of the wind turbine 10).

Still referring to FIG. 2, the wind turbine 10 may also include one or more sensors 48, 50 for measuring various operating conditions that may be used to determine the operating state of the wind turbine 10 as described in more detail below. For example, in various embodiments, the sensors may include blade sensors 48 for measuring a pitch angle of one of the rotor blades 22 or for measuring a load acting on one of the rotor blades 22; generator sensors (not shown) for monitoring the generator 24 (e.g. torque, rotational speed, acceleration and/or the power output); sensors for measuring the imbalance loading in the rotor (e.g. main shaft bending sensors); and/or various wind sensors 50 for measuring various wind conditions, such as wind speed, wind peaks, wind turbulence, wind shear, changes in wind direction, air density, or similar. Further, the sensors may be located near the ground of the wind turbine, on the nacelle, or on a meteorological mast of the wind turbine. It should also be understood that any other number or type of sensors may be employed at any location. For example, the sensors may be Micro Inertial Measurement Units (MIMUs), strain gauges, accelerometers, pressure sensors, angle of attack sensors, vibration sensors, proximity sensors, Light Detecting and Ranging (LIDAR) sensors, camera systems, fiber optic systems, anemometers, wind vanes, Sonic Detection and Ranging (SODAR) sensors, infra lasers, radiometers, pitot tubes, radiosondes, other optical sensors, and/or any other suitable sensors. It should be appreciated that, as used herein, the term "monitor" and variations thereof indicate that the various sensors may be configured to provide a direct measurement of the conditions being monitored or an indirect measurement of such conditions. Thus, the sensors may, for example, be used to generate signals relating to the condition being monitored, which can then be utilized by the controller 26 to determine the actual condition.

Figure 3:
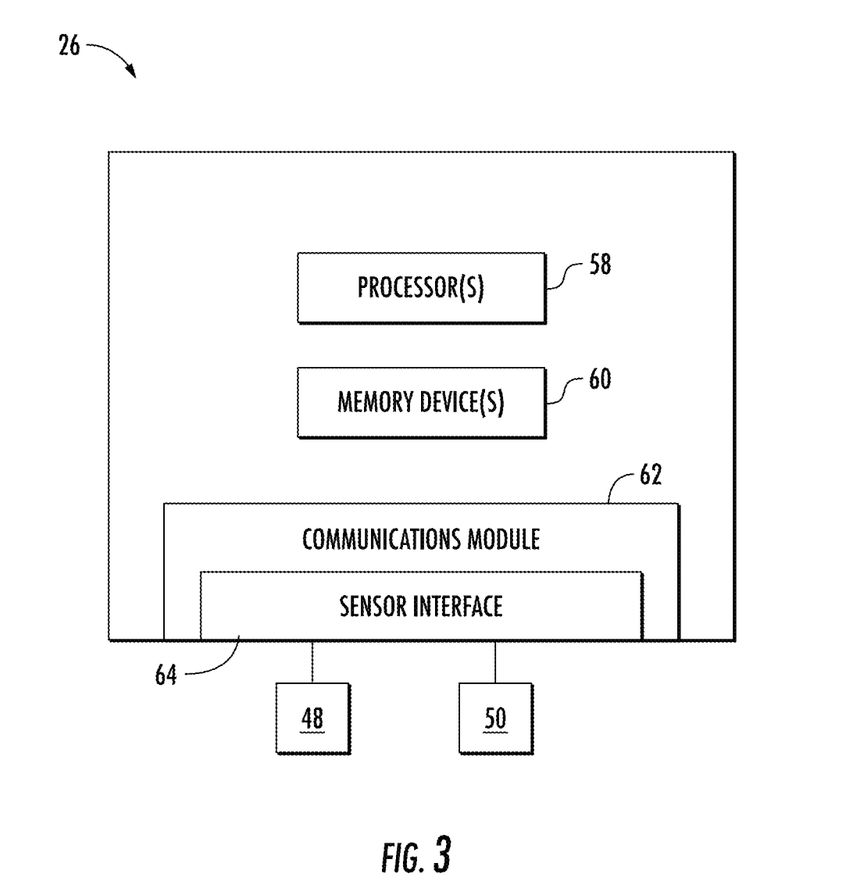
FIG. 3 illustrates a schematic diagram of an embodiment of a controller according to the present disclosure.

Referring now to FIG. 3, a block diagram of an embodiment of various components of the controller 26 according to the present disclosure is illustrated. As shown, the controller 26 may include one or more processor(s) 58 and an associated memory device(s) 60 configured to perform a variety of computer-implemented functions (e.g., performing the methods, steps, calculations, and the like and storing relevant data as disclosed herein). Additionally, the controller 26 may also include a communications module 62 to facilitate communications between the controller 26 and the various components of the wind turbine 10. Further, the communications module 62 may include a sensor interface 64 (e.g., one or more analog-to-digital converters) to permit signals transmitted from the sensors 48, 50 to be converted into signals that can be understood and processed by the processors 58. It should be appreciated that the sensors 48, 50 may be communicatively coupled to the communications module 62 using any suitable means. For example, as shown in FIG. 3, the sensors 48, 50 are coupled to the sensor interface 64 via a wired connection. However, in other embodiments, the sensors 48, 50 may be coupled to the sensor interface 64 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 60 may generally include memory element(s) including, but not limited to, computer-readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 60 may generally be configured to store suitable computer-readable instructions that, when implemented by the processor(s) 58, configure the controller 26 to perform various functions including, but not limited to, determining one or more current wind turbine conditions of the wind turbine 10 based on the plurality of operating data, determining a maximum wind turbine condition, transmitting suitable control signals to implement control actions to reduce loads acting on the wind turbine, and various other suitable computer-implemented functions.

In addition, the controller 26 may also include various models, algorithms, or other systems of control, that, when implemented by the controller 26, may assist in compensating for rotor imbalances as will be described in greater detail hereinbelow. For example, the controller 26 may include a preprogrammed algorithm, such as an adaptive filter algorithm, or, more specifically, a closed loop adaptive filter algorithm, or, more specifically, recursive least squares. As described, the term "adaptive filter algorithm" generally refers to an algorithm that acts as a filter for a signal that adapts based upon a difference between an actual output signal and a desired output signal. Further, the term "closed loop adaptive filter algorithm" generally refers to an adaptive filter algorithm that adapts a filter in a closed loop until the difference between an actual output signal and a desired output signal is reduced or minimized to a desired level. Further, the term "recursive least squares" generally refers to a closed loop adaptive filter algorithm that recursively estimates coefficients to be used with the filter that reduces or minimizes a cost or loss function.

As stated above, the controller 26 may also include one or more models programmed therein. For example, the controller 26 may include a preprogrammed model, such as an inverse model, or, more specifically a pure inverse model or a practical inverse model. As described, the term "inverse model" generally refers to a model which inverts an expected output of the model. Further, the term "pure inverse model" generally refers to a mathematical inversion of the tower model equations, while the term "practical inverse model" generally refers to a modification of the pure inverse model such that is suitable and realizable as a filter. Specifically, as it relates to practical inverse models, the output may be filtered to extract a desired estimated value for a specific input. More specifically, as it relates to the tower model equation, the practical inverse model may act as a filter to extract an estimate of the tower acceleration due to the impact of mass imbalance. As described herein, both algorithms, such as the adaptive filter algorithm, and models, such as the inverse model, may provide particular advantages when used to provide systems and methods for compensating for rotor imbalances as will be discussed in further detail hereinbelow.

Figure 4:
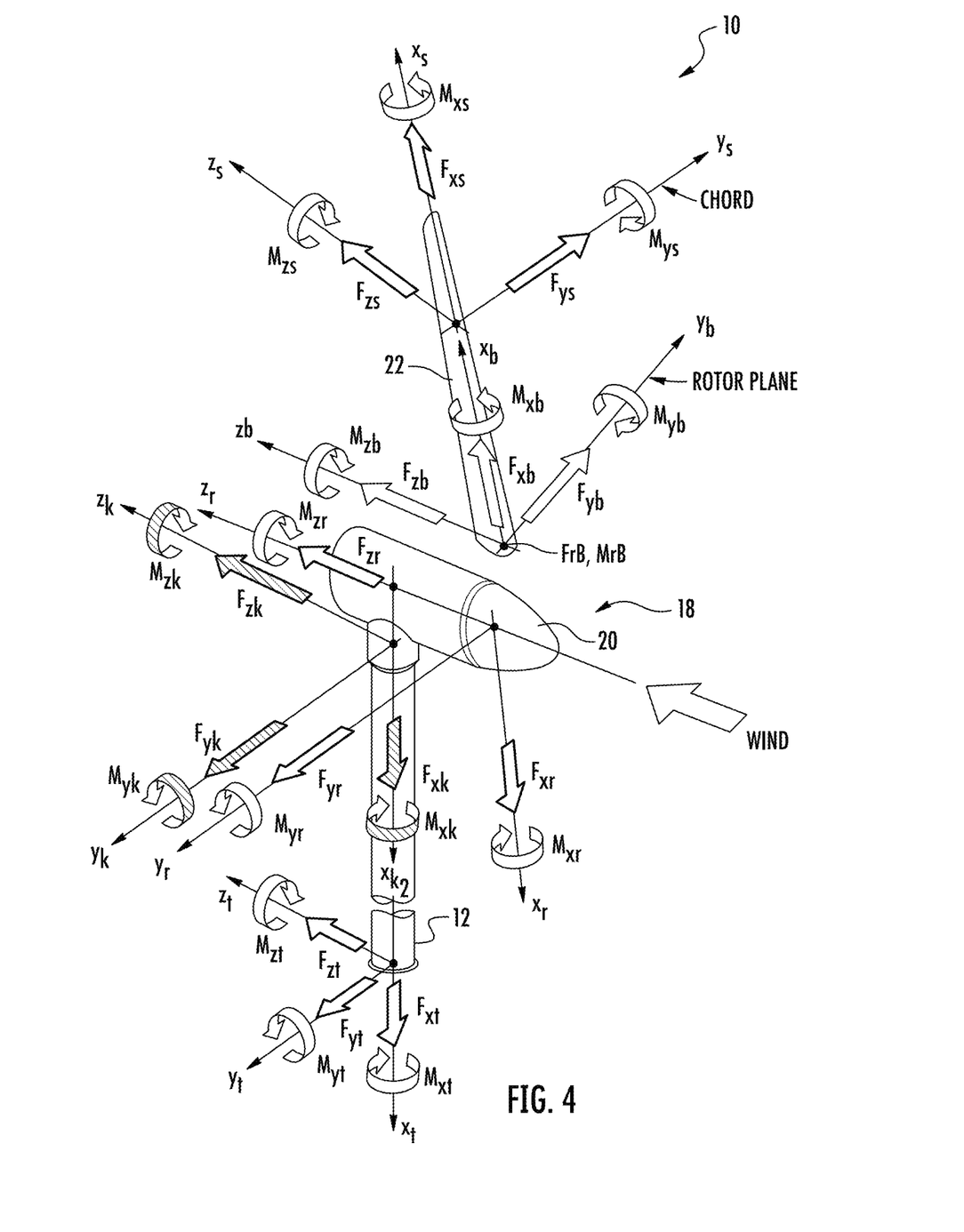
FIG. 4 illustrates a perspective view of an embodiment of a wind turbine according to the present disclosure, particularly illustrating various axes of rotation and corresponding forces and moments acting on the wind turbine.

Referring now to FIG. 4, an exploded view of an embodiment of the wind turbine 10 is shown, particularly illustrating various axes of rotation and corresponding forces and moments acting on the wind turbine 10 according to the present disclosure. The forces exerted on the wind turbine 10 may vary, but in general, typically correspond to at least one of the following: the blade root resultant force (e.g. $F_{rB}$), pitch and hub forces ($F_{xB}$, $F_{yb}$, and $F_{zb}$), main shaft forces (e.g. $F_{yr}$, $F_{zr}$), main bearing forces (e.g. $F_{xr}$, $F_{yr}$), yaw drive forces (e.g. $F_{xk}$), yaw bolts/bearing/flange forces (e.g. $F_{yk}$, $F_{zA}$) or tower bending forces (e.g. $F_{xt}$, $F_{yt}$, and $F_{zt}$). As a result of the forces being exerted on the wind turbine 10 at various locations, moment loads may also be exerted upon the wind turbine 10.

Thus, the moment loads exerted on the wind turbine 10 may also vary, but in general, typically correspond to at least one of the following: the blade root resultant moment load (e.g. $M_{rB}$), pitch and hub moment loads ($M_{xB}$, $M_{yb}$, and $M_{zb}$), main shaft moment loads (e.g. $M_{yr}$, $M_{zr}$), main bearing moment loads (e.g. $M_{xr}$, $M_{yr}$), yaw drive moment loads (e.g. $M_{xk}$), yaw bolts/bearing/flange moment loads (e.g. $M_{yk}$, $M_{zA}$) or tower bending moment loads (e.g. $M_{xt}$, $M_{yt}$, and $M_{zt}$). It should be understood that the forces and moment loads as described herein may also include any additional forces or moment loads experienced by the wind turbine 10 and that the forces and moment loads illustrated in FIG. 4 are provided for example purposes only.

Figure 5:
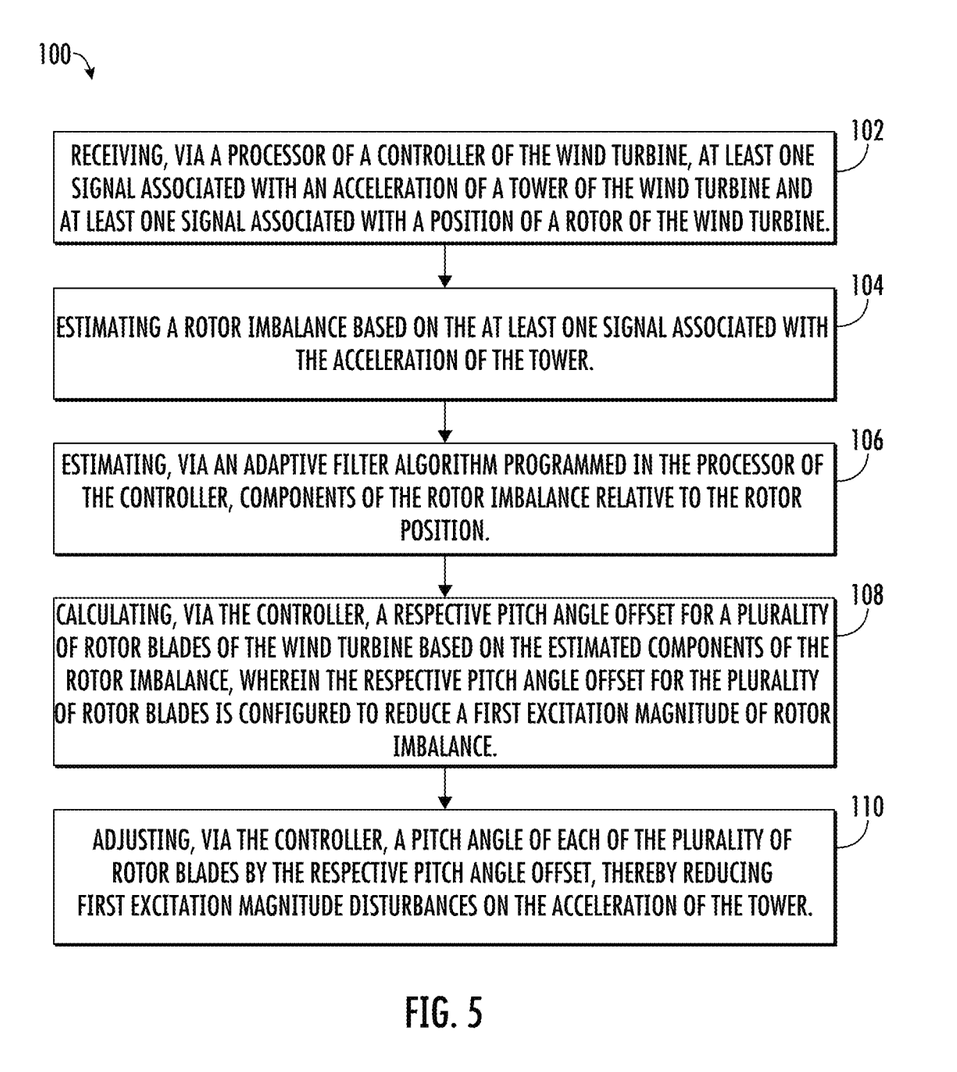
FIG. 5 illustrates a flow chart of an embodiment of a method for compensating for rotor imbalances of a wind turbine according to the present disclosure.

Referring now to FIG. 5, a flow chart of an embodiment of a method for compensating for rotor imbalances of a wind turbine according to the present disclosure is illustrated. In an embodiment, the rotor blade imbalances of the present disclosure may include mass imbalances between rotor blades which result in inertial moment imbalances exhibited in the rotor, but other types of imbalance forces may be accounted for, such as aerodynamic imbalances between the rotor blades. The method 100 is described herein as being implemented on, for example, the wind turbine 10 described above. However, it should be appreciated that the disclosed method 100 may be implemented using any other suitable wind turbine now known or later developed in the art. In addition, although FIG. 5 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

As shown at (102), the method 100 includes receiving at least one signal associated with acceleration of the tower 12 of the wind turbine 10 and at least one signal associated with a position of a rotor 18 of the wind turbine 10. In an embodiment, the signal(s) may represent the acceleration of the tower 12 at a point in time. Further, multiple signals may be provided to represent the acceleration across a period of time. More specifically, in an embodiment, the signal(s) may represent the side-to-side acceleration of the tower 12 that is attributed to a natural frequency of the tower 12 and/or any other type of signal which is related to a rotor imbalance exhibited by the rotor 18 of the wind turbine 10 due to the rotor blades 22.

In addition, in an embodiment, the signal associated with the position of the rotor 18 may represent where rotor 18 is located at a point in time. Multiple signals may be provided to represent the position of the rotor 18 across a period of time.

As shown at (104), the method 100 includes estimating a rotor imbalance based on the at least one signal associated with the acceleration of the tower. As used herein, a rotor imbalance can generally include a force, an acceleration, a moment, or functions thereof. To estimate the rotor imbalance, a model such as an inverse model, pure inverse model, or practical inverse model may be employed as described above.

Figure 6A:
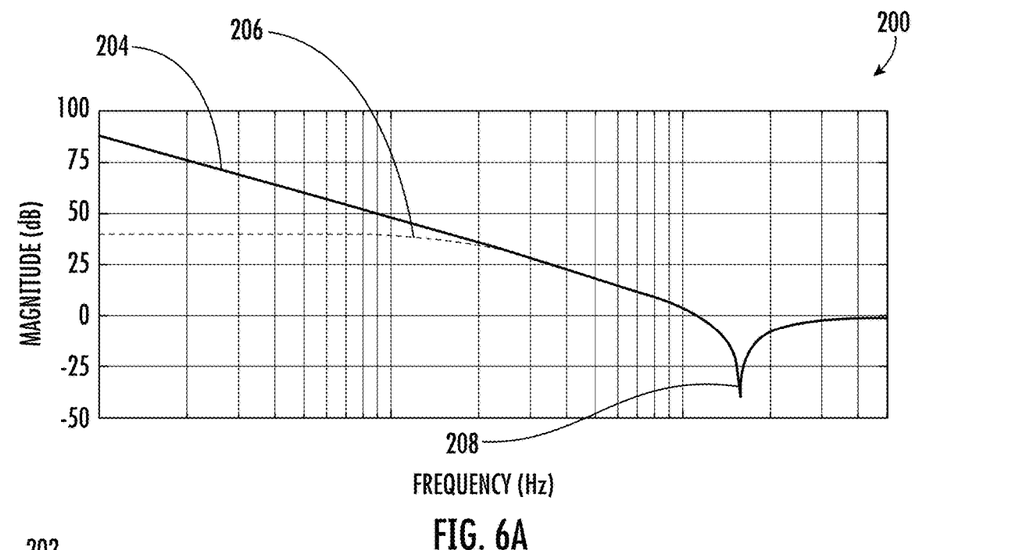
FIGS. 6A-6B illustrate various graphs of an embodiment of magnitude and phase (y-axis) versus frequency (x-axis), respectively, of a pure inverse model compared to a practical inverse model of the movement of a tower of a wind turbine according to the present disclosure.
Figure 6B:
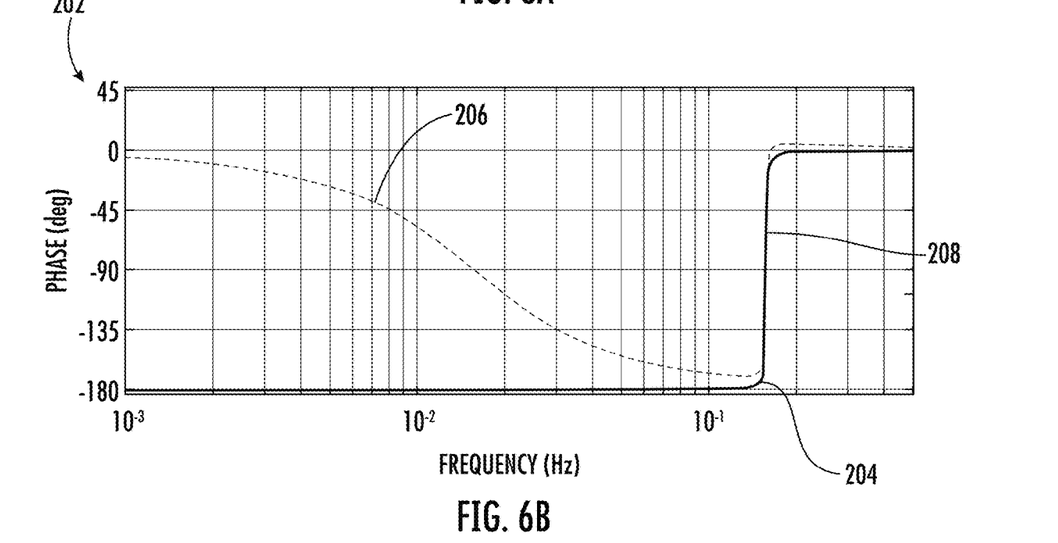

For example, referring now to FIGS. 6A-6B, various graphs of an embodiment of magnitude and phase (y-axis) versus frequency (x-axis), respectively, of a pure inverse model compared to a practical inverse model of movement of a tower of a wind turbine are illustrated according to the present disclosure. More specifically, as shown, graph 200 (FIG. 6A) depicts magnitude (y-axis) versus frequency (x-axis) of a pure inverse model 204 compared with a practical inverse model 206, while graph 202 (FIG. 6B) depicts phase (y-axis) versus frequency (x-axis) of the pure inverse model 204 compared with the practical inverse model 206. In particular, as shown, the inverse model depicts a graph of an inverse frequency response, or Bode plot, of the tower 12 as a function of a magnitude and a phase of the signal associated with the tower 12. In addition, the inverse model provides a dynamic simulation of how the tower 12 acts as the frequency of the tower's 12 movement or acceleration changes.

As can be seen from the graphs 200, 202, the frequency 208 at which the magnitude inversely peaks and a large shift in phase occurs may be determined. Thus, in an embodiment, the magnitude and phase of the frequency 208 may be compared with a known natural frequency of the tower 12 of the wind turbine 10 to determine the rotor imbalance force. As described herein, the term "natural frequency of the tower" refers to the natural movements of the tower due to forces distributed across the wind turbine 10 as a result of a mass of the wind turbine 10.

Accordingly, in an embodiment, to determine the rotor imbalance force, the known natural frequency of the tower 12 of the wind turbine 10 may be removed from the signal of the tower 12 by implementing the inverse model to filter the signal through the inverse model as depicted in graphs 200, 202. Other factors aside from the natural frequency of the tower 12 may also be removed from the signal via the inverse model. For example, if wind is enacting a force upon the wind turbine 10, then the frequency of the tower attributed to wind forces may also be removed from the signal of the tower 12 depicted in the graphs 200, 202.

Figure 7:
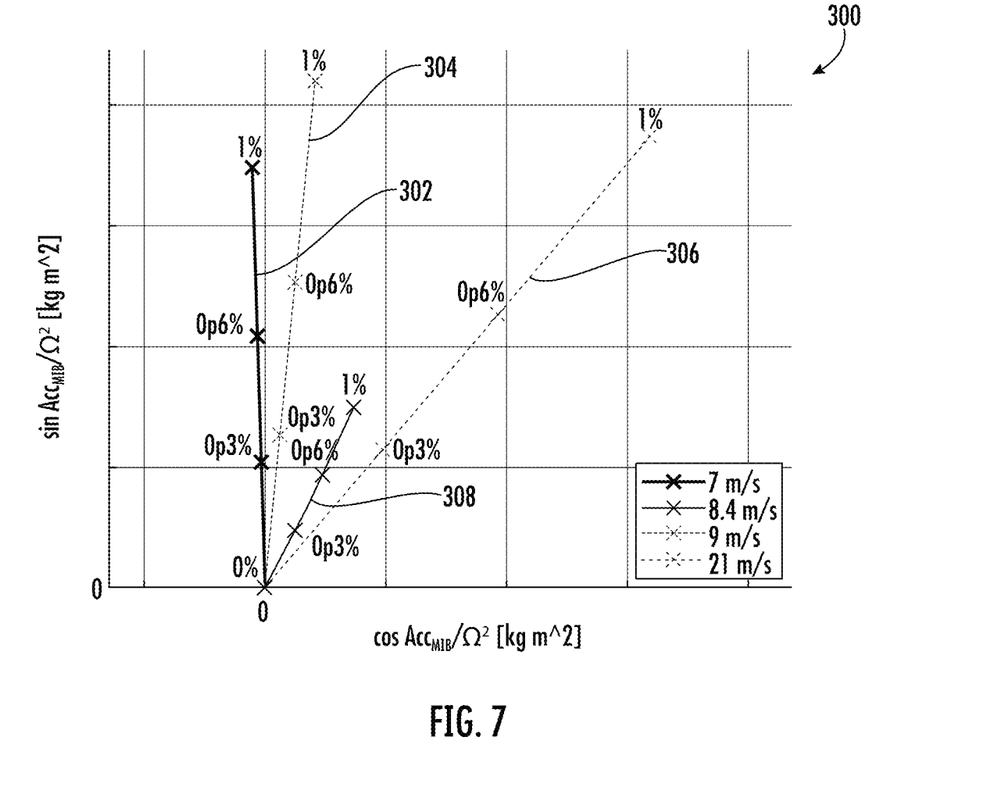
FIG. 7 illustrates a graph of an embodiment of an estimation of first excitation frequency vectors due to rotor imbalances at multiple wind speeds according to the present disclosure.

In an embodiment, the method 100 may include dividing the acceleration of the tower 12 by a square of a rotor speed of the wind turbine 10. This may allow for the components (e.g., the sine and cosine components) of the rotor imbalance to be better graphically represented as shown in graph 300 (FIG. 7). Dividing the acceleration of the tower 12 by the rotor speed may help provide better data which can be contrasted with when determining pitch angle offsets for the rotor blades 22 to compensate for the rotor imbalance forces.

Referring back to FIG. 5, as shown at (106), the method 100 further includes estimating, via an adaptive filter algorithm programmed in the processor 58 of the controller 26, components of the rotor imbalance relative to the rotor position. In an embodiment, the adaptive filter algorithm may be a closed loop adaptive filter algorithm or recursive least squares, programmed in the processor 58 of the controller 26. For example, in an embodiment, the adaptive filter algorithm may determine an estimate of the sine and cosine components of rotor imbalance of the rotor 18. In particular, the estimated sine and cosine components of the rotor imbalance may represent a decomposition of the rotor imbalance. This decomposition may enable the analysis of the rotor imbalance in such a manner that offsets can be determined which reduce the imbalances. To account for a variety of conditions, the sine and cosine components may be estimated at a variety of wind speeds that may exist at the wind turbine 10. The sine and cosine components may also be estimated for other operating conditions existing at or surrounding the wind turbine 10. For example, the sine and cosine components may be estimated at a variety of air densities at the wind turbine 10 or a variety of rotor speeds or power levels of the wind turbine 10.

Further, the sine and cosine components may be estimated at the position of the rotor 18 of the wind turbine 10 or relative to the position of the rotor 18 of the wind turbine 10. More specifically, in an embodiment, the adaptive filter algorithm may be used to lock the estimation of the tower acceleration to the rotor position of the wind turbine 10 by resolving/matching the estimated tower acceleration signal into both the sine and cosine component of the rotor position. By locking the estimation of tower acceleration to the rotor position, the sine and cosine components due to rotor imbalances may be separated from the sine and cosine components of the total forces acting on the wind turbine 10.

The sine and cosine components may then be used to represent the rotor imbalance. More specifically, the sine and cosine components may represent a first excitation frequency for the forces occurring at the rotor 18 of the wind turbine 10. The components of the rotor imbalance may be estimated at a plurality of wind speeds and be represented by vectors. Based on whether a pure inverse model is used or a practical inverse model is used, the sine and cosine components may be adjusted to compensate for the difference between the pure inverse model and the practical inverse model.

As an example of such components which represent the rotor imbalance, FIG. 7 illustrates a graph of an embodiment of an estimation of first excitation frequency vectors due to mass imbalance forces at multiple wind speeds according to the present disclosure. As shown, the graph 300 depicts multiple vectors 302, 304, 306, 308 that represent the components of the rotor imbalance at multiple wind speeds according to the present disclosure. Specifically, the graph 300 depicts vectors 302, 304, 306, 308 at a first excitation frequency for the tower 12 where the magnitude of the vectors 302, 304, 306, 308 is attributed to the rotor imbalance force. In addition, as shown, the vectors 302, 304, 306, 308 are representative of the cosine (x-axis) and sine (y-axis) components of the rotor imbalance that causes a partial side-to-side acceleration of the tower 12. The components of the rotor imbalance may also be estimated for other conditions existing at or surrounding the wind turbine 10. For example, the components of the rotor imbalance may be estimated at a variety of air densities at the wind turbine 10 or a variety of rotor speeds or power levels of the wind turbine 10.

Returning back to FIG. 5, as shown at (108), the method 100 includes calculating a respective pitch angle offset for the plurality of rotor blades 22 of the wind turbine 10 based on the estimated components of the rotor imbalance where the respective pitch angle offset for the plurality of rotor blades 22 is configured to reduce a first excitation magnitude of rotor imbalance. The calculation of the moment may be performed when the wind turbine 10 is inactive or prior to the estimation of the rotor imbalance. The calculated moment may be mapped and stored in memory, such as the memory device(s) 60 of the controller 26. When desired, the controller 26 may retrieve the calculated moment from memory for further utilization.

In an embodiment, the controller 26 is configured to calculate a moment at a base of the tower 12 using the rotor imbalance and a wind speed, which applies a force, at the wind turbine 10. The controller 26 may then calculate a minimum standard deviation of the moment to determine the pitch angle offset for each of the rotor blades 22 of the wind turbine 10. In such embodiments, the controller 26 can also determine a sum of the pitch angle offsets for rotor blades 22 such that the sum is equal to or approximately equal to zero.

Like the calculation of the moment, the calculation of the minimum standard deviation of the moment may be performed when the wind turbine 10 is inactive or prior to the estimation of the rotor imbalance. Further, like the calculated moment, the minimum standard deviation of the moment may be mapped and stored in memory, such as the memory device(s) 60 of the controller 26. Similarly, when desired, the controller 26 may retrieve the minimum standard deviation of the moment from memory for further utilization.

In particular embodiments, the pitch angle offsets for the rotor blades 22 may be calculated by determining pitch angle offsets that correspond to a minimized standard deviation of the moment at the base of the tower 12 with respect to a predefined target value. In addition, the pitch angle offsets may also be determined by finding pitch angle offsets that correspond to a minimization of the standard deviation of the electrical power output by the wind turbine 10 using the pitch angle offsets of the rotor blades 22 and a minimization of the standard deviation of the moment at the base of the tower 12. For both of these implementations, the pitch angle offsets is calculated such that the sum of the pitch angle offsets is equal to zero.

Specifically, if solving for pitch angle offsets that minimize the standard deviation of the moment at the base of the tower 12, then an optimization equation may be provided according to Equation (1) below.

$$\min_{\Delta\emptyset_1, \Delta\emptyset_2, \Delta\emptyset_3} \left\| \frac{std\,(TwrSS) - std\,(TwrSS_{target})}{std\,(TwrSS)} \right\| \text{ such that } \Delta\emptyset_1 + \Delta\emptyset_2 + \Delta\emptyset_3 = 0 \quad (1)$$

Where $\Delta\emptyset_1$, $\Delta\emptyset_2$, and $\Delta\emptyset_3$ are equal to the pitch angle offsets of the rotor blades 22;

TwrSS is equal to the movement of the tower 12; and $TwrSS_{target}$ is equal to the target movement of the tower 12. Furthermore, if solving for pitch angle offsets that both minimize the standard deviation of the moment at the base of the tower 12 and the electrical output of the wind turbine 10, then an optimization equation may be provided according to Equation (3) below.

$$\min_{\Delta\emptyset_1, \Delta\emptyset_2, \Delta\emptyset_3} \left\| \frac{std\,(TwrSS) - std\,(TwrSS_{target})}{std\,(TwrSS)} \right\| + \left\| \frac{std\,(PwrEl) - std\,(PwrEl_{target})}{std\,(PwrEl)} \right\|, \text{ such that } \Delta\emptyset_1 + \Delta\emptyset_2 + \Delta\emptyset_3 = 0 \quad (1)$$

Where $\Delta\emptyset_1$, $\Delta\emptyset_2$, and $\Delta\emptyset_3$ are equal to the pitch angle offsets of the rotor blades 22;

TwrSS is equal to the movement of the tower 12;

$TwrSS_{target}$ is equal to the target movement of the tower 12;

PwrEl is equal to the electrical power output of the wind turbine 10; and $PwrEl_{target}$ is equal to the target electrical power output of the wind turbine 10.

As a result of solving for pitch angle offsets which correspond to minimized standard deviations of either moments or moments and electrical power output, a reduction of the tower movement or an increase in the stability and quality of the electrical power output by the wind turbine 10 is provided. In addition, by requiring that the sum of the pitch angle offsets of the rotor blades 22 be equal to zero, aerodynamic balance between the rotor blades 22 may be maintained while providing the aforementioned improved outcomes.

The pitch angle offset for each of the rotor blades 22 may then be correlated with the signal of the tower 12 to calculate sine and cosine components of each pitch angle offset for the rotor blades 22. The calculated sine and cosine components of each pitch angle offset may then be compared with the sine and cosine components of the rotor imbalance to determine an adjustment of the pitch angle of each of the rotor blades 22 by a respective pitch angle offset. In particular, the pitch angle offset may be calculated and compared with the rotor imbalance using a proportional controller programmed in the processor 58 of the controller 26. As described, the term "proportional controller" generally refers to a controller that implements a proportional change to an actual output in response to a difference between the actual output and a desired output.

As it relates to calculating the pitch angle offset, the proportional controller may calculate a percentage to either increase or decrease the present pitch angle of the rotor blades 22 using the pitch angle offset. For example, the percentage may be about half or less than half of the pitch angle offset. By only using half or less than half of the pitch angle offset, the possibility of negative outcomes such as overcorrection of the pitch angle may be avoided. In addition, by using a proportional controller, multiple types of inputs for rotor imbalance may be employed at the same time. For example, the proportional controller may simultaneously use a mass imbalance or an inertial moment imbalance in combination with an aerodynamic imbalance exhibited in the rotor blades 22.

Specifically, in an embodiment, the proportional controller may provide a constant offset in the pitch angle of the rotor blades 22 to compensate at least two different types of rotor imbalances. For example, as discussed above, the proportional controller may be able to utilize both mass force imbalances and aerodynamic imbalances in the rotor blades 22. In case two different control strategies (i.e., accounting for mass force imbalances and aerodynamic imbalances) are implemented, some level of coordination can be maintained between the two strategies in order for the end solution to converge to a stable solution. If both strategies are limited to proportional action only, then such a stable solution is achieved naturally, as opposed to a solution where both control solutions contain some form of accumulators that could potentially be growing in opposite directions and never converging to an end solution.

In addition, the pitch angle offsets can be calculated for multiple wind speeds. For example, referring now to FIG. 8, a graph of an embodiment of a simulation of pitch angle offset with mass imbalance at multiple wind speeds to reduce the first excitation magnitude of the vectors 302, 304, 306, 308 depicted in FIG. 7 according to the present disclosure is illustrated. As shown, the graph 400 depicts pitch angle offset vectors 402, 404, 406, 408, respectively, with the vectors 302, 304, 306, 308 of the rotor imbalance forces shown in graph 300 of FIG. 7. Accordingly, the pitch angle offset vectors 402, 404, 406, 408 and the vectors 302, 304, 306, 308 of the tower rotor imbalance forces can be compared and used to adjust the pitch angle of the rotor blades 22.

Figure 8:
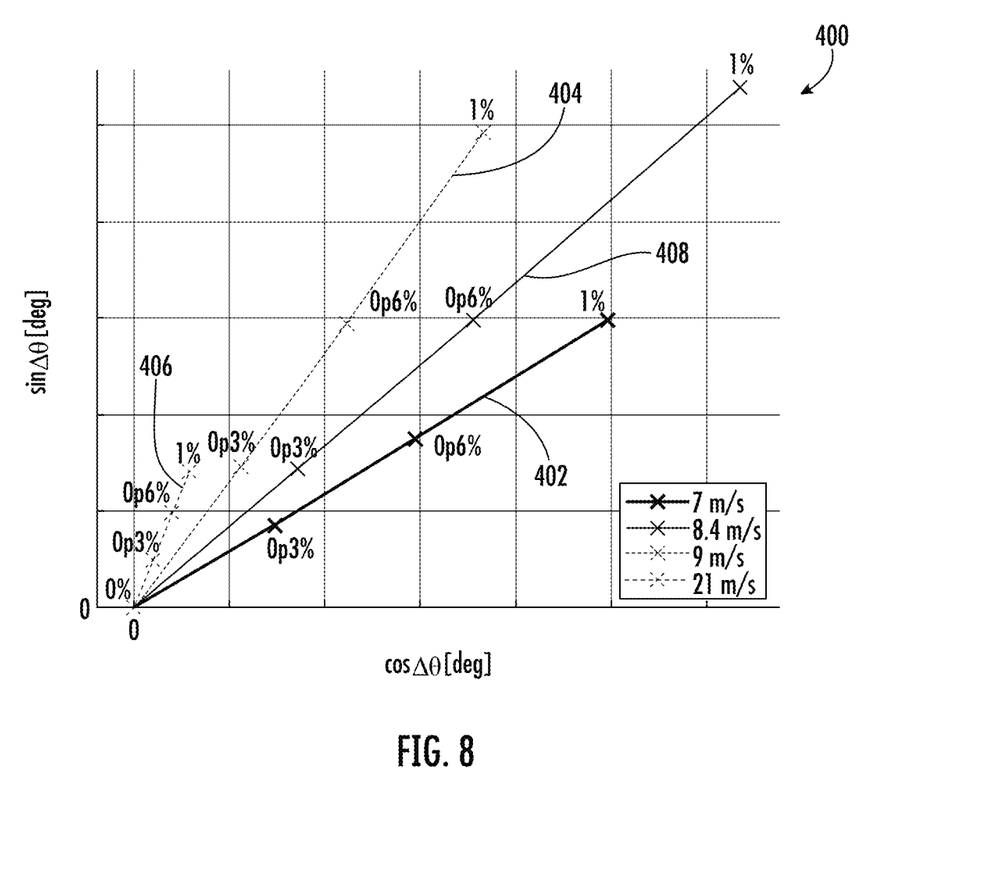
FIG. 8 illustrates a graph of an embodiment of a simulation of pitch angle offset with mass imbalance at multiple wind speeds to reduce the first excitation magnitude of the vectors depicted in FIG. 7 according to the present disclosure.

Referring back to FIG. 5, as shown at (110), the method 100 includes adjusting a pitch angle of each of the plurality of rotor blades 22 by the respective pitch angle offset to reduce the first excitation magnitude, thereby reducing or minimizing first excitation magnitude disturbances on the acceleration of the tower 12. More specifically, when the controller 26 instructs the wind turbine 10 to adjust the pitch angle of the rotor blades 22 according to the vectors 402, 404, 406, 408, as shown in FIG. 8, the first excitation magnitude disturbances caused by the rotor imbalance forces depicted by vectors 302, 304, 306, 308 in FIG. 7 may be reduced or minimized. As a consequence, the tower acceleration of the wind turbine 10 may be reduced by compensating for the rotor imbalance according to the present disclosure.

Figure 9A:
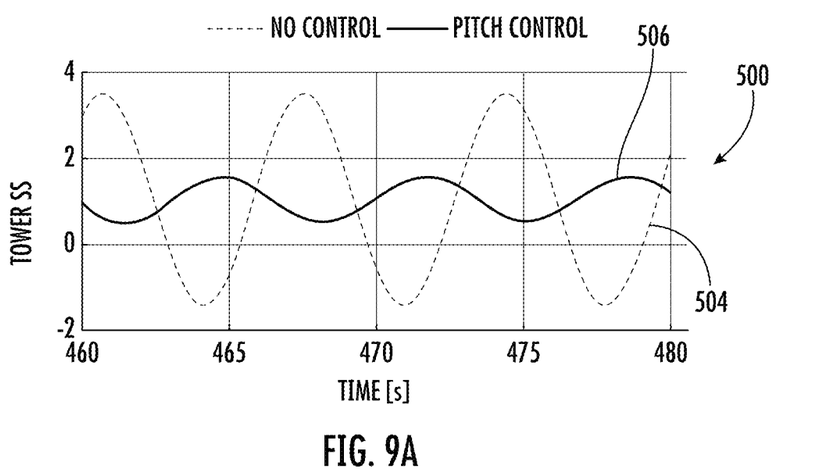
FIG. 9A illustrates a graph of an embodiment of tower side-to-side movement being reduced by compensating for rotor imbalances according to the present disclosure.
Figure 9B:
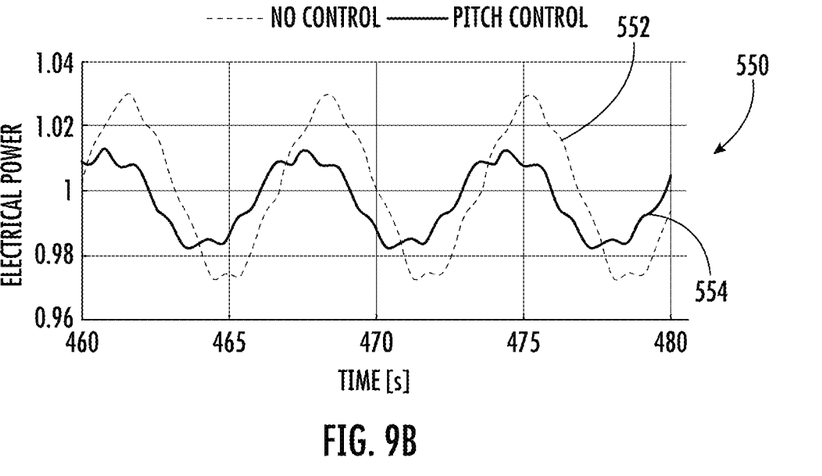
FIG. 9B illustrates a graph of an embodiment of electrical power output quality being improved by compensating for rotor imbalances according to the present disclosure.

Referring now to FIGS. 9A-9B, graphs of tower side-to-side movement and electrical power output are depicted according to the present disclosure. As shown, graph 500 and graph 550 depict the side-to-side movement of the tower 12 and the electrical power output of the wind turbine 10, respectively. In particular, as shown in FIG. 9A, graph 500 depicts the side-to-side movement 504 of the tower 12 without control, as well as and side-to-side movement 506 of the tower 12 with rotor imbalance compensation according to the present disclosure. Accordingly, as shown, the side-to-side movement or acceleration of the tower 12 may be reduced by compensating for rotor imbalance forces according to the present disclosure.

Further, as shown in FIG. 9B graph 550 depicts the electrical power output 552 of the wind turbine 10 without control and the electrical power output 554 of the wind turbine 10 with rotor imbalance compensation according to the present disclosure. Thus, as shown in FIG. 9B, the power quality output by the wind turbine 10 may be increased (i.e., less oscillation in voltage) by compensating for rotor imbalance according to the present disclosure.

This written description uses examples to disclose the present disclosure, including the best mode, and also to enable any person skilled in the art to practice the present disclosure, including making and using any devices or systems and performing any incorporated methods. The patentable scope of the present disclosure is defined by the claims and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of compensating for rotor imbalance of a wind turbine, the method comprising:
   receiving, via a processor of a controller of the wind turbine, at least one signal associated with an acceleration of a tower of the wind turbine and at least one signal associated with a position of a rotor of the wind turbine;
   estimating a rotor imbalance based on the at least one signal associated with the acceleration of the tower;
   estimating, via an adaptive filter algorithm programmed in the processor of the controller, components of the rotor imbalance relative to the rotor position;
   calculating, via the controller, a respective pitch angle offset for a plurality of rotor blades of the wind turbine based on the estimated components of the rotor imbalance, wherein the respective pitch angle offset for the plurality of rotor blades is configured to reduce a first excitation magnitude of rotor imbalance; and
   adjusting, via the controller, a pitch angle of each of the plurality of rotor blades by the respective pitch angle offset, thereby reducing first excitation magnitude disturbances on the acceleration of the tower.

2. The method of claim 1, wherein the at least one signal associated with the acceleration of the tower of the wind turbine comprises a side-to-side acceleration of the tower due to a natural frequency of the tower and the rotor imbalance, and the first excitation magnitude comprises a partial side-to-side acceleration of the tower due to the rotor imbalance.

3. The method of claim 2 further comprising:
   removing, from the at least one signal associated with the acceleration of the tower, the side-to-side acceleration of the tower due to a natural frequency of the tower by filtering the acceleration signal through an inverse model of the tower dynamics.

4. The method of claim 3 further comprising:
   dividing the filtered tower acceleration of the wind turbine by a square of a rotor speed of the wind turbine.

5. The method of claim 1, wherein the adaptive filter algorithm comprises recursive least squares (RLS).

6. The method of claim 1, wherein the estimated components of the rotor imbalance comprise sine and cosine components of the rotor position.

7. The method of claim 1, wherein estimating, via the adaptive filter algorithm programmed in the processor of the controller, the components of the rotor imbalance relative to the rotor position comprises estimating the components of the rotor imbalance at a plurality of wind speeds or air densities at the wind turbine or a plurality of rotor speeds or power levels of the wind turbine.

8. The method of claim 1 further comprising:
   calculating the respective pitch angle offset for the plurality of rotor blades of the wind turbine based on the estimated components of the rotor imbalance via a proportional controller programmed in the processor of the controller.

9. The method of claim 1, wherein calculating the respective pitch angle offset for the plurality of rotor blades based on the estimated components of the rotor imbalance further comprises:
   calculating a moment at the base of the tower using the rotor imbalance and at least one of wind speed or air density at the wind turbine or rotor speed or power level of the wind turbine; and
   determining the respective pitch angle offset for each of the plurality of rotor blades that corresponds to a minimum standard deviation of the moment at the base of the tower such that the sum of the respective pitch angle offset for each of the plurality of rotor blades is about equal to zero.

10. The method of claim 1, wherein calculating the respective pitch angle offset for the plurality of rotor blades based on the estimated components of the rotor imbalance further comprises:
  calculating the components of each pitch angle offset of the plurality of rotor blades; and
  determining the respective pitch angle offset for the plurality of rotor blades using the components of each pitch angle offset and at least one of wind speed or air density at the wind turbine or rotor speed or power level of the wind turbine.

11. A system for compensating for rotor imbalance of a wind turbine, the system comprising:
  the wind turbine comprising a tower, a rotor, and a plurality of rotor blades;
  a controller communicatively coupled with the wind turbine, the controller comprising a processor, the controller configured to:
    receive, via the processor, at least one signal associated with an acceleration of a tower of the wind turbine and at least one signal associated with a position of a rotor of the wind turbine;
    estimate a rotor imbalance based on the at least one signal associated with the acceleration of the tower;
    estimate, via an adaptive filter algorithm programmed in the processor of the controller, components of the rotor imbalance relative to the rotor position;
    calculate, via the controller, a respective pitch angle offset for a plurality of rotor blades of the wind turbine based on the estimated components of the rotor imbalance, wherein the respective pitch angle offset for the plurality of rotor blades is configured to reduce a first excitation magnitude of rotor imbalance; and
    adjust, via the controller, a pitch angle of each of the plurality of rotor blades by the respective pitch angle offset, thereby reducing first excitation magnitude disturbances on the acceleration of the tower.

12. The system of claim 11, wherein the at least one signal associated with the acceleration of the tower of the wind turbine comprises a side-to-side acceleration of the tower due to a natural frequency of the tower and the rotor imbalance, and the first excitation magnitude comprises a partial side-to-side acceleration of the tower due to the rotor imbalance.

13. The system of claim 12, wherein the controller is further configured to:
  remove, from the at least one signal associated with the acceleration of the tower, the side-to-side acceleration of the tower due to a natural frequency of the tower by filtering the acceleration signal through an inverse model of the tower dynamics.

14. The system of claim 13, wherein the controller is further configured to:
  divide the filtered tower acceleration of the wind turbine by a square of a rotor speed of the wind turbine.

15. The system of claim 11, wherein the adaptive filter algorithm comprises recursive least squares (RLS).

16. The system of claim 11, wherein the estimated components of the rotor imbalance comprise sine and cosine components of the rotor position.

17. The system of claim 11, wherein estimating, via the adaptive filter algorithm programmed in the processor of the controller, the components of the rotor imbalance relative to the rotor position comprises estimating the components of the rotor imbalance at a plurality of wind speeds or air densities at the wind turbine or a plurality of rotor speeds or power levels of the wind turbine.

18. The system of claim 11, wherein the controller is further configured to:
  calculate the respective pitch angle offset for the plurality of rotor blades of the wind turbine based on the estimated components of the rotor imbalance via a proportional controller programmed in the processor of the controller.

19. The system of claim 11, wherein calculating the respective pitch angle offset for the plurality of rotor blades based on the estimated components of the rotor imbalance further comprises:
  calculating a moment at the base of the tower using the rotor imbalance and at least one of wind speed or air density at the wind turbine or rotor speed or power level of the wind turbine; and
  determining the respective pitch angle offset for each of the plurality of rotor blades that corresponds to a minimum standard deviation of the moment at the base of the tower such that the sum of the respective pitch angle offset for each of the plurality of rotor blades is about equal to zero.

20. The system of claim 11, wherein calculating the respective pitch angle offset for the plurality of rotor blades based on the estimated components of the rotor imbalance further comprises:
  calculating the components of each pitch angle offset of the plurality of rotor blades; and
  determining the respective pitch angle offset for the plurality of rotor blades using the components of each pitch angle offset and at least one of wind speed or air density at the wind turbine or rotor speed or power level of the wind turbine.

* * * * *